July 21, 1964

J. B. PETERS 3,141,365

PORTABLE LATHE

Filed March 9, 1961

4 Sheets-Sheet 2

*INVENTOR.*
JAMES B. PETERS

BY *Kenway, Jenney & Hildreth*

ATTORNEYS

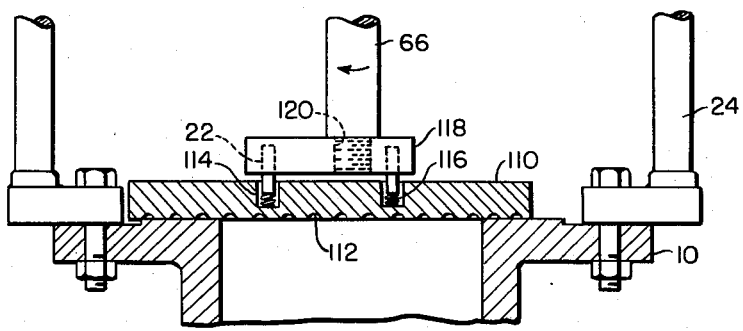
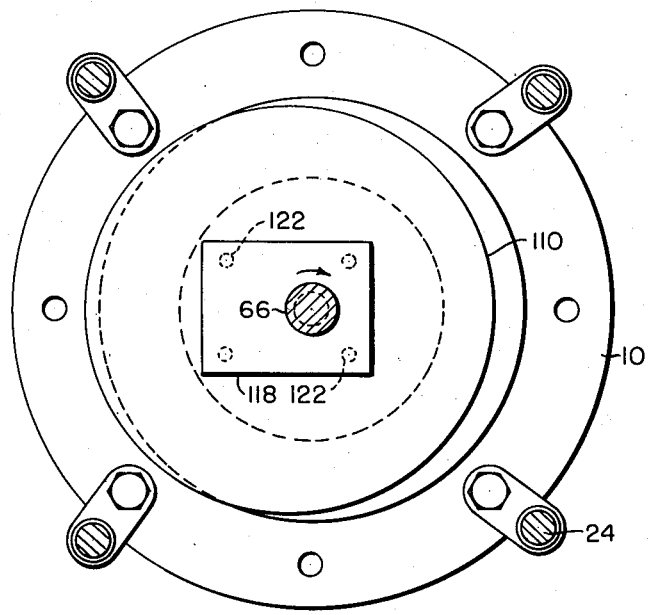

July 21, 1964 J. B. PETERS 3,141,365
PORTABLE LATHE
Filed March 9, 1961 4 Sheets-Sheet 4
FIG. 7
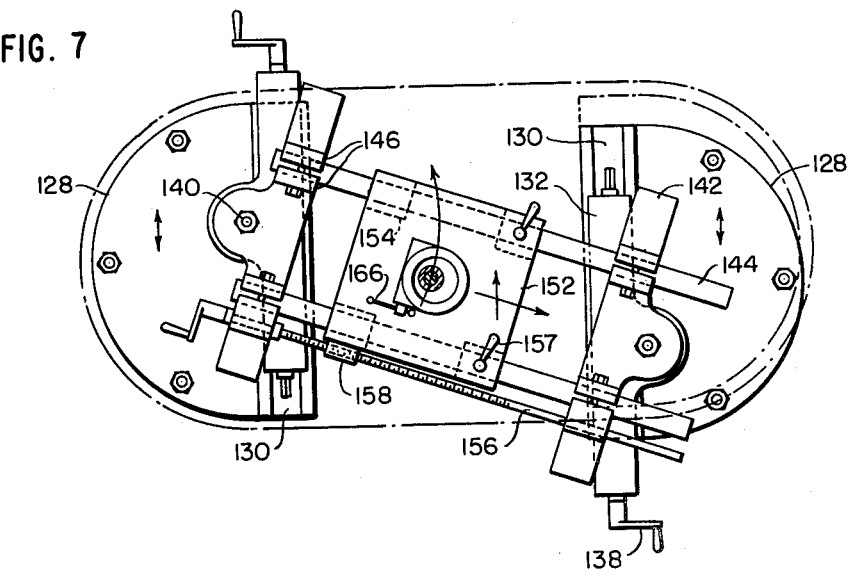
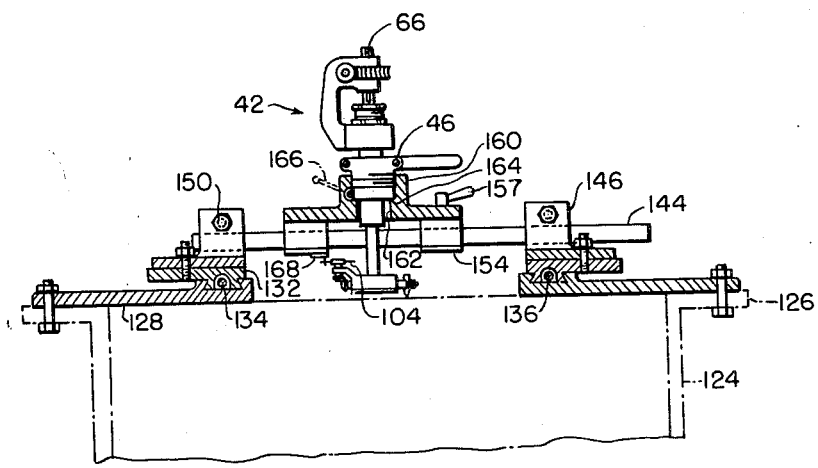
FIG. 8
*INVENTOR.*
JAMES B. PETERS
BY
*Kenway, Jenney & Hildreth*
ATTORNEYS

United States Patent Office 3,141,365
Patented July 21, 1964

3,141,365
PORTABLE LATHE
James B. Peters, 563 Chestnut St., Lynn, Mass.
Filed Mar. 9, 1961, Ser. No. 94,473
5 Claims. (Cl. 82—4)

This invention relates to portable lathes and more particularly comprises a new and improved lathe mountable on flanged workpieces and provided with novel means for centering the axis of the lathe spindle with respect to the workpiece.

When refacing the flange of a large diameter steam pipe to prevent leakage or correct alignment between the flanged faces of two connecting pieces, it is a difficult and expensive task to remove an entire pipe section from the system and transfer it to a shop for repair. It is equally difficult to remove large valves, pumps, turbines and similar equipment from their installed locations in order to make repairs which require the use of a lathe or milling machine.

It is an object of the present invention to provide a portable lathe which may be quickly and easily attached to the flanged face of a workpiece to perform cutting and facing operations in situ.

Another object of this invention is to provide in a portable lathe novel means for adjustably mounting the lathe spindle so that it may be readily centered with respect to the workpiece.

Yet another object of this invention is to provide improved means for conveniently locking the spindle in a selected position.

As a novel feature of this invention a laterally adjustable bracket is mounted on the face of the workpiece and supports for rotation a tool-carrying spindle. The spindle may be bodily moved about an arc eccentric to its own axis whereby it may be centered over the workpiece by lateral adjustment of the bracket together with an eccentric adjustment of the spindle.

As another feature of this invention an improved tool carrier is mountable on the spindle which is also adapted to carry a novel lapping plate for finishing the cut surface of the workpiece.

Figure 1:
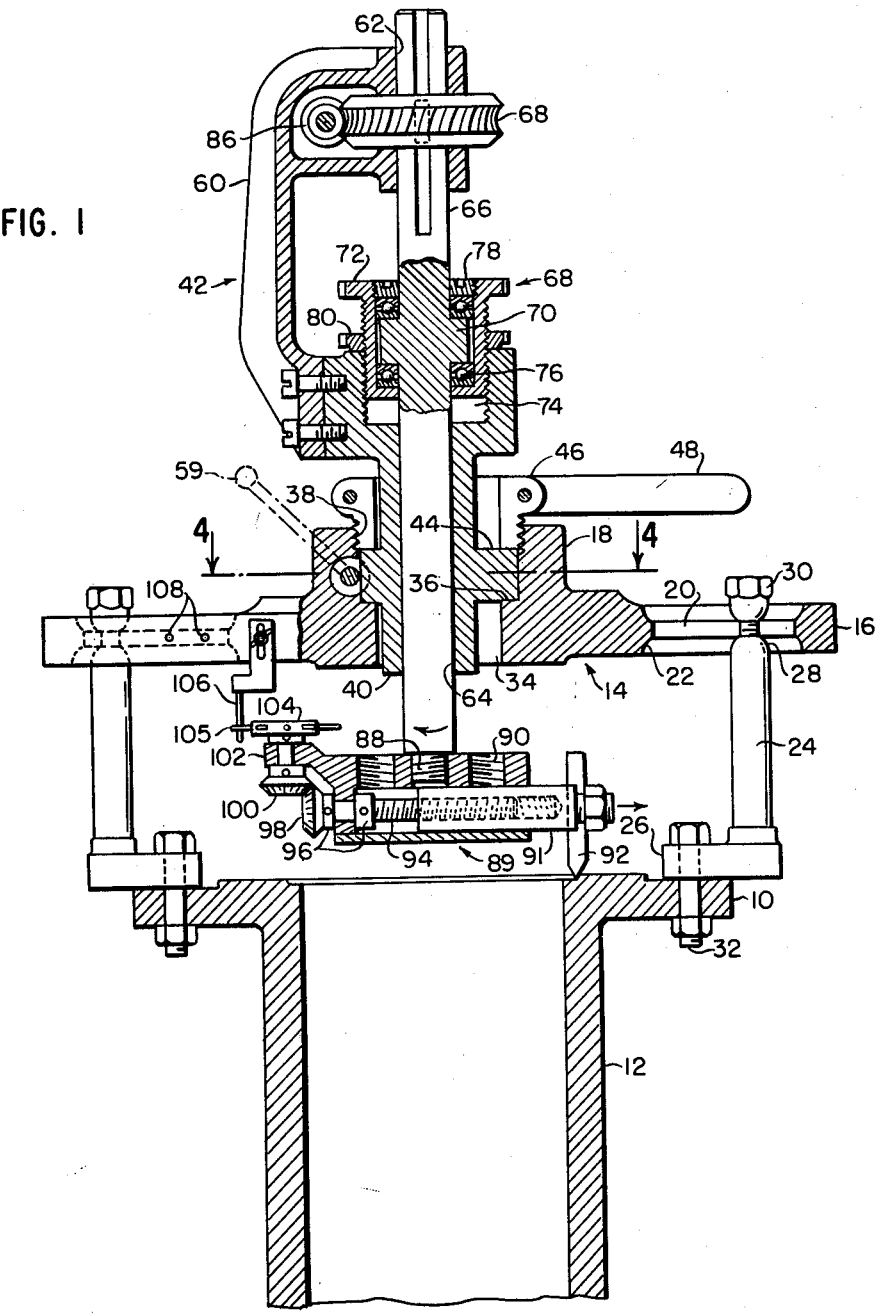
Figure 2:
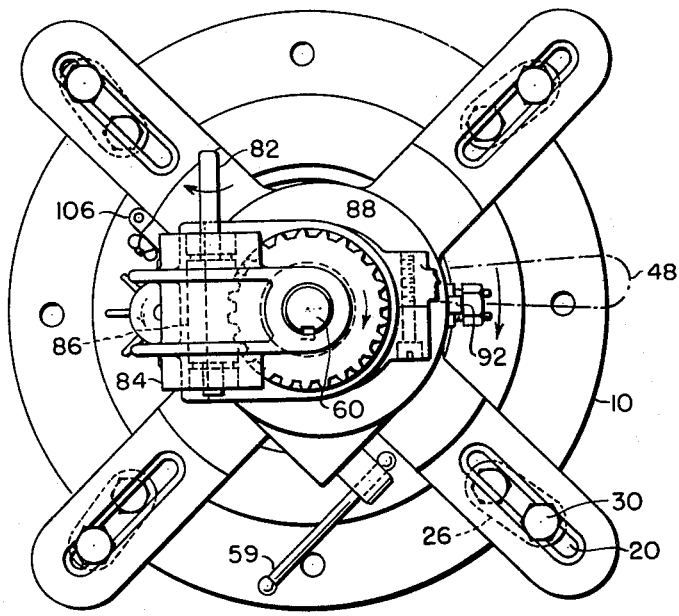
Figure 3:
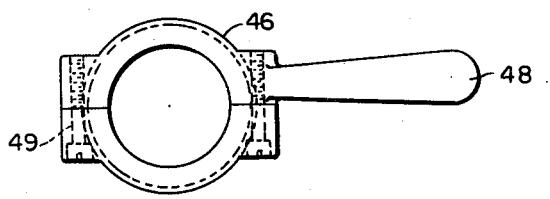
Figure 4:
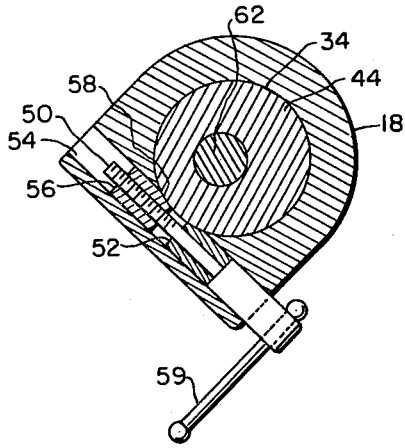

These and other features of the invention along with further objects and advantages thereof will appear more fully from the following detailed description taken in connection with the accompanying drawings, in which:

FIG. 1 is a view in side elevation partly in section of a portable lathe made according to the invention, FIG. 2 is a top plan view of the lathe illustrated in FIG. 1, FIG. 3 is a top plan view of a locking ring for holding the spindle support in its proper position, FIG. 4 is a cross sectional view taken along the line 4—4 of FIG. 1, FIG. 5 is a detail view in side elevation showing a lapping plate connected to the lathe spindle, FIG. 6 is a top plan view of the device shown in FIG. 5, FIG. 7 is a top plan view of a modification of the invention, and FIG. 8 is a view in side elevation partly in section of the FIG. 7 embodiment.

Referring now to the drawings, there is illustrated in FIG. 1 a portable lathe bolted to a flange 10 of a pipe 12. The lathe of FIGS. 1 and 2 is organized about a bracket or spider 14 having a plurality of radial rams 16 extending from a hub 18. Each arm is formed with a radial slot 20 having balled seating surfaces 22 provided on either side thereof. A set of legs 24, each having a foot portion 26, serve to mount the spider 14 in spaced relation over the face of the flange 10. It will be noted that the upper portion of each leg is rounded as at 28 to mate with the corresponding balled seating surface 22.

Similarly, a balled nut 30 is utilized to secure the leg 24 to the spider arm 16. The feet 26 may be suitably secured to the pipe flange as by bolts 32. It will be readily understood that by loosening either the nut 30 or the bolts 32 the spider may be laterally adjusted and the feet 26 may be turned in or out according to the location of the bolt holes in the flange 10.

Formed axially through the hub 18 is a cylindrical opening 34 having an upwardly facing annular shoulder 36 and provided with a threaded portion 38 at its upper end. Received within the openings 34 is the lower shank end 40 of a spindle support 42. It will be observed in FIG. 1 that while the shank 40 is cylindrical in contour and has a somewhat smaller diameter than that of the opening 34 it is provided with an eccentric collar 44 which rests upon the shoulder 36. A lock nut 46 (FIG. 3), having a radial handle 48, is mounted within the opening 34 and in threaded engagement with the threaded portion 38. The nut 46 will be seen in FIG. 1 to bear against the top surface of the eccentric collar 44 to hold the collar down against the shoulder 36 whereby the spindle support will remain in a fixed axial position. To facilitate assembly and disassembly of the lathe, the lock nut 46 has been bisected with the halves joined by screws 49.

To lock the spindle support 42 against rotation once it has been properly centered, the hub 18 has been provided with a locking device designed for quick and convenient operation. As viewed best in FIG. 4 the locking device comprises a feed screw 50 rotatably mounted in a journal 52 and extending into a passage 54 formed transversely through the hub 18 and intersecting the opening 34. A follower 56, threaded to the screw 50, is formed with an arcuate face 58 to meet in locking engagement with the cylindrical outer surface of the eccentric collar 44. A slip handle 59 may be provided on the outer end of the feed screw to quickly rotate the screw and move the follower into or out of engagement with the eccentric collar 44.

The spindle support 42 as viewed in FIG. 1 is fabricated with an upper bracket 60 which may be secured to the lower portion by bolts 61 to facilitate assembly. The topmost portion of the bracket 42 is bifurcated and provided with an opening 62 co-axial with an opening 64 formed axially through the lower shank end 40 of the spindle support. An elongated spindle 66 is rotatably mounted in the openings 62, 64 and is maintained in a predetermined axial position by means of an adjustable bearing assembly 68 engaging opposite sides of a collar 70 formed on the spindle 66. The bearing assembly comprises a tubular housing 72 threaded into a socket 74 in the upper end of the shank 40. Ball bearings 76 are fitted within the housing and secured therein by means of an annulus 78. A lock nut 80 engages the threaded outer surface of the housing 72 and bears against the upper end of the shank 40 when in locked position. From the foregoing description it will be clear that the axial or vertical position of the spindle can be adjusted by screwing the bearing assembly 68 into or out of the socket 74 and then locking it by means of the nut 80.

The spindle 66 may be rotated by any suitable means such as an electric motor (not shown) drivingly connected to a shaft 82. The shaft 82 is rotatably mounted to the top of the bracket 60 by a bearing 84 and is oriented normal to the axis of the spindle. The shaft carries a worm 86 which is in mesh with a worm gear 88 keyed to the spindle 66. A tool holder 89 is attached to the lower end of the spindle 66 by means of a threaded stem 88 formed at the extremity of the spindle and screwed into one of a set of tapped holes 90. This secures the holder to the spindle and provides means for adjusting the holder radially with respect to the spindle. The holder, as shown in FIG. 1, is provided with a slide 91 holding a cutting tool 92 which extends into cutting engagement with the workpiece, in this instance being the face of the flange 10. The radial position of the tool is governed by a feed screw 94 threaded into the slide 91 and held against axial displacement in the holder by means of a pair of collars 96.

The feed screw carries a bevel gear 98 which meshes with a similar bevel gear 100 having an axis normal to that of the feed screw. The gear 100 is rotatably supported by a projection 102 formed in the body of the holder. A wheel 104, connected with the gear 100 and provided with a number of radial spokes 105, cooperates with a tripping bar 106 fastened to an arm of the spider 14 and extending into proximity of the path of the wheel 104 as it rotates with the spindle. It will be understood that with this assembly the tripping bar 106 will strike one of the spokes 105 for each rotation of the spindle. Each time the tripping bar strikes a spoke the wheel 104 will be rotated, perhaps 45° about its axis, thereby turning the gear 100, and the feed screw 94 to advance the cutting tool 92 radially across the workpiece. In facing the flange 10 of FIG. 1 the tool 92 will rotate in the direction of the arrows and with small increments of motion, determined by the ratios of the gears as well as the pitch of the feed screw threads, will advance outward relative to the flange. Rotation of the spindle in a direction opposite to that indicated will of course move the tool radially inward. To allow for radial adjustment of the tool holder, the tripping bar 106 may be mounted in any one of a set of tapped holes 108 located along the arm of the spider.

Referring now to FIGS. 5 and 6 the tool holder 89 has been replaced by a novel lapping assembly for finishing the cut surface of the workpiece. The assembly includes a circular lapping plate 110 suitably grooved as at 112 on its lapping face to receive grinding compound. The upper surface of the plate has a number of recesses 114 each seating a resilient element such as a coil spring 116. A rectangular block 118 having an eccentrically disposed tapped hole 120 is screwed onto the stem 88 of the spindle 66 and provided with a number of depending pins 122 received in the recesses 114. With the spindle 66 centered with respect to the workpiece, the lapping plate will rotate eccentrically over the surface of the work to avoid uneven wear between the working surfaces. The coil springs 116 serve to cushion the plate and to provide an even distribution of pressure between the plate and the flange face.

The mechanisms illustrated in FIGS. 1–6 are particularly adapted for use with circular or annular working surfaces such as pipe flanges and the like. Not infrequently, however, repair must be made on machines where the flat supporting surface is non-circular or irregular in contour. In such cases the assembly shown in FIGS. 7 and 8 will find particular utility.

In this embodiment an adjustable carriage is provided for mounting the spindle 66 and spindle support 42 of FIG. 1 over the workpiece. For purposes of illustration the workpiece is shown as having a rather wide tubular casing 124 and a flat flange 126 on which the carriage is supported. The carriage assembly includes a pair of semicircular plates 128, having a number of boltholes suitably spaced along the curved marginal edges thereof whereby the two plates may be bolted against the flange 126.

Along the straight edges of each plate there is formed a track 130 in dovetail engagement with a slide 132. Each slide has a feed screw 134 mounted lengthwise therein and in threaded engagement with a nut 136 fixed to the end of the track 130. Preferably one feed screw should be arranged to be operated from a side of the carriage opposite to the other feed screw to provide a greater measure of flexibility in operation and adjustment. Manual rotation of the feed screw 134, as by a handle 138, will move the slide 132 lengthwise along the track.

Pivotally mounted on each plate 128 about a pin 140 is a bracket 142 and these are joined together and held in spaced parallel rotation by means of a pair of cross bars 144. The bars may be secured to the brackets by passing the ends thereof through openings defined by spaced uprights 146 formed integral with the bracket 142. The bars may be locked in position by tightening bolts 150 extending between the uprights.

Mounted for movement along the cross bars 144 is a table 152 substantially square in plan view and slidably engaging the bars by means of annular bearings 154 forming part of the table, and depending from each corner thereof. The table may be moved along the bars 144 by manual rotation of a feed screw 156 extending between the two brackets 142 and in threaded engagement with a bushing 158 secured to one of the bearings 154. Locking screws 157 are provided through two of the bearings to bear against the bars 144 and lock the plate in position.

The table 152 is provided with a centrally located hub 160 having an axial opening 162 formed therein to receive the spindle support 42 and spindle 66 previously described in connection with FIGS. 1–6. The locking ring 46, as before, serves to hold the spindle support down against an annular shoulder 164 formed in the walls of the opening. A locking device 166, similar to that illustrated in FIG. 4, is provided to hold the spindle support 42 against rotation. Also as before, either a cutting tool as shown or a lapping plate may be mounted on the spindle and a tripping bar 168 may be conveniently located in one of the bearings 154 in position to strike the spokes of the wheel 104.

From the above description it will be understood that the carriage of FIGS. 7 and 8 provides full lateral adjustment of the spindle over the workpiece. By proper manipulation of the feed screws 138 and 156 the spindle may be properly centered over any point within the carriage's range of movement. Minor corrective adjustments may be made by rotating the spindle support 42 within the opening 162 to move the spindle 16 about an eccentric arc. As indicated by the solid lines of FIG. 7 the pivot connection at 140 permits the semi-circular plates 128 to be offset from one another to permit the carriage to be mounted on unusual working surfaces. This feature also permits the device to be used for routing or for similar cutting operations. For instance with a suitable cutting tool attached to the spindle 66 the locking bolts between the uprights 146 may be loosened on one of the brackets 142 and the feed screw 138 for that bracket may be rotated moving its slide 132 laterally and at the same time moving the spindle 66 through an arc indicated by the curved arrow of FIG. 7. Alternatively both feed screws 138 may be operated simultaneously to move the spindle along a straight path.

While the invention has been described with particular reference to the illustrated embodiments, many modifications may be made thereto without departing from the invention.

Having thus described the invention what I claim and desire to obtain by Letters Patent of the United States is:

1. A portable lathe for working on the face of a workpiece such as a pipe flange, comprising a spider having an opening formed axially therethrough, means for adjustably mounting said spider on a workpiece in spaced relation to the face thereof, a spindle support mounted in the opening of the spider and being rotatably adjustable relative to said spider, said support being formed with a longitudinal opening extending concentrically therethrough and an eccentric collar by which it is supported in the spider, a spindle rotatably mounted in the longitudinal opening of the support, a facing tool mounted on the end of said spindle adjacent said workpiece, and means for rotataing said spindle about its longitudinal axis to drive said tool, said spindle being adapted to be axially centered with respect to said workpiece by rotation of said spindle support with its eccentric collar supplemented by appropriate lateral movement of said spider.

2. A portable lathe for working on the face of a workpiece such as a pipe flange, comprising a spider having an opening formed axially therethrough, means for adjustably mounting said spider over a workpiece in parallel spaced relation to the face thereof, a spindle support mounted in said opening and being rotatably adjustable relative to said spider, said spindle support being formed with a longitudinal opening concentrically parallel to the axis of said spider and an eccentric collar by which it is supported in the spider, a spindle rotatably mounted in said longitudinal opening and oriented perpendicular to the face of said workpiece, said spindle adapted to be centered with respect to said workpiece by rotation of said spindle support with its eccentric collar supplemented by lateral adjustment of said spider, means for locking said spider and said spindle support in a selected position and a facing tool mounted on the end of said spindle adjacent said workpiece.

3. A portable lathe for working on the face of a workpiece such as a pipe flange, comprising a spider having an opening formed axially therethrough, means for adjustably mounting said spider on a workpiece in spaced relation to the face thereof, a spindle support mounted in the opening of the spider and being rotatably adjustable relative to said spider, means for locking said spindle support in fixed position, said support being formed with a longitudinal opening extending concentrically therethrough and an eccentric collar by which it is supported in the spider, a spindle rotatably mounted in the opening of the support, means for axially adjusting the spindle relative to the spindle support, said spindle being adapted to be axially centered with respect to said workpiece by rotation of the spindle support with its eccentric collar supplemented by appropriate lateral movement of the spider, and a facing device mounted on said spindle for engagement with the workpiece.

4. A portable lathe according to claim 3 wherein the facing device includes a tool holder, a slide mounted in said holder and adapted to move radially in and out relative to said spindle, a cutting tool mounted on said slide and movable therewith, and slide moving means including a tripping bar attached to the spider adapted to move the slide upon rotation of the spindle.

5. A portable lathe according to claim 3 wherein the facing device includes a supporting block rigidly and eccentrically mounted on the end of the spindle and a lapping plate resiliently mounted on said block adapted to move eccentrically over the face of the workpiece when the spindle is rotated.

References Cited in the file of this patent

UNITED STATES PATENTS

| 2,157,375 | Wiessner | May 9, 1939 |
|---|---|---|
| 2,211,134 | Kruell | Aug. 13, 1940 |
| 2,283,323 | Erhardt | May 19, 1942 |
| 2,395,519 | Tocci-Guilbert | Feb. 26, 1946 |
| 2,518,929 | Peters | Aug. 15, 1950 |
| 2,660,096 | Morton | Nov. 24, 1953 |

FOREIGN PATENTS

| 551,514 | Great Britain | Feb. 25, 1943 |